United States Patent
Honda

(10) Patent No.: US 9,007,525 B2
(45) Date of Patent: Apr. 14, 2015

(54) AUDIO AND VIDEO COMMUNICATIONS APPARATUS AND COMMUNICATIONS METHOD THEREOF

(75) Inventor: Yoshimasa Honda, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 621 days.

(21) Appl. No.: 12/992,703

(22) PCT Filed: Mar. 1, 2010

(86) PCT No.: PCT/JP2010/001362
§ 371 (c)(1),
(2), (4) Date: Nov. 15, 2010

(87) PCT Pub. No.: WO2010/106743
PCT Pub. Date: Sep. 23, 2010

(65) Prior Publication Data
US 2011/0063504 A1 Mar. 17, 2011

(30) Foreign Application Priority Data
Mar. 16, 2009 (JP) ................ 2009-063498

(51) Int. Cl.
*H04N 9/475* (2006.01)
*H04N 7/087* (2006.01)
*H04N 7/173* (2011.01)
*H04N 7/26* (2006.01)
*H04N 7/56* (2006.01)
*H04N 7/14* (2006.01)
*H04N 21/242* (2011.01)
(Continued)

(52) U.S. Cl.
CPC ............ *H04N 7/56* (2013.01); *H04N 7/142* (2013.01); *H04N 21/242* (2013.01); *H04N 21/4302* (2013.01); *H04N 21/4305* (2013.01); *H04N 21/4307* (2013.01); *H04N 21/4341* (2013.01); *H04N 21/44004* (2013.01);
(Continued)

(58) Field of Classification Search
None
See application file for complete search history.

(56) References Cited

U.S. PATENT DOCUMENTS 5,594,467 A * 1/1997 Marlton et al. ............... 345/641
6,674,803 B1 * 1/2004 Kesselring ............... 375/240.26
(Continued)

FOREIGN PATENT DOCUMENTS

| JP | 2004-15553 | 1/2004 |
|---|---|---|
| JP | 2007-49460 | 2/2007 |
| JP | 2008-258665 | 10/2008 |

OTHER PUBLICATIONS

International Search Report issued Mar. 23, 2010 in International (PCT) Application No. PCT/JP2010/001362.

*Primary Examiner* — Joseph Ustaris
*Assistant Examiner* — William Adrovel
(74) *Attorney, Agent, or Firm* — Wenderoth, Lind & Ponack, L.L.P.

(57) ABSTRACT

An audio and video communications apparatus eliminates a system clock frequency difference, freeing a user from unconformable feeling of audio and video. The audio and video communications apparatus includes: a transmitting unit and a receiving unit (106/108) transmitting and receiving audio and video via a network; a PTS correction timing determining unit (111) determining timing to update a correction amount of a PTS according to information of the audio or the video to be transmitted and received, the PTS being given to the received audio or the received video; a PTS correcting unit (112) correcting the PTS by updating the correction amount at the timing determined by the PTS correction timing determining unit (111); and an audio and video output unit (113) outputting the received audio and the received video corresponding to the corrected PTS found at a current time indicated by the audio and video communications apparatus.

11 Claims, 12 Drawing Sheets

(51) Int. Cl.
*H04N 21/43* (2011.01)
*H04N 21/434* (2011.01)
*H04N 21/44* (2011.01)
*H04N 21/442* (2011.01)
*H04N 21/4425* (2011.01)
*H04N 21/4788* (2011.01)

(52) U.S. Cl.
CPC .... *H04N 21/44209* (2013.01); *H04N 21/4425* (2013.01); *H04N 21/4788* (2013.01)

(56) References Cited

U.S. PATENT DOCUMENTS

| | | | |
|---|---|---|---|
| 6,760,749 B1* | 7/2004 | Dunlap et al. | 709/204 |
| 7,657,668 B2* | 2/2010 | Escott | 710/29 |
| 2006/0072627 A1* | 4/2006 | Kugumiya et al. | 370/503 |
| 2009/0180755 A1* | 7/2009 | Kanemaru et al. | 386/84 |
| 2009/0190670 A1* | 7/2009 | Lin et al. | 375/240.27 |
| 2010/0166079 A1* | 7/2010 | Goel | 375/240.25 |
| 2011/0261257 A1* | 10/2011 | Terry et al. | 348/515 |

* cited by examiner

AUDIO AND VIDEO COMMUNICATIONS APPARATUS AND COMMUNICATIONS METHOD THEREOF

TECHNICAL FIELD

The present invention relates to audio and video communications apparatuses and communications methods thereof and, in particular, to an audio and video communications apparatus for a videoconference and a communications method thereof.

BACKGROUND ART

Burgeoning networks of Asymmetric Digital Subscriber Lines (ADSL) and optical fibers allow users to have high-speed Internet accesses at a low cost. Such high-speed and low-cost Internet services and the resulting mutual transmission of audio and video data between distant points easily make possible establishing videoconference systems.

One of those available videoconference systems presents a personal and realistic scene so as to display a person on a large screen display in a real size, employing a camera with an imaging capability in a high definition (HD) resolution and a larger display such as a plasma display panel (PDP).

Such a videoconference system with a large screen offering a personal and realistic scene is capable of displaying a person in a real size, using for example a full-high definition video (images) having pixels of 1920×1080 and showing a fluid motion at 60 frames per second. Thus, jerky images and audio result in quality deterioration.

In addition, the videoconference system establishes a two-way communication of audio and video, which differs from one-way broadcasting of audio and video. In the videoconference system, a system clock of a videoconference apparatus working as a transmission terminal and a system clock of a videoconference apparatus working as a reception terminal cannot synchronize each other.

The videoconference apparatus working as the reception terminal reproduces audio and video (AV) according to a time stamp assigned for each packet on the videoconference apparatus working as the transmission terminal. The system clock frequency of videoconference apparatus working as the reception terminal and the system clock frequency of videoconference apparatus working as the transmission terminal are different each other because the system clocks of the transmission and reception terminals are out of synchronization.

In the case where the system clock of the videoconference apparatus working as the reception terminal gains more time than that of the videoconference apparatus working as the transmission terminal, for example, AV reproduction by the videoconference apparatus working as the reception terminal is sooner than transmission of reproduction data by the videoconference apparatus working as the transmission terminal. Thus, the reproduction data runs out (under flow). In the case where the system clock of the videoconference apparatus working as the reception terminal loses more time than that of the videoconference apparatus working as the transmission terminal, on the contrary, AV reproduction by the videoconference apparatus working as the reception terminal is later than transmission of reproduction data by the videoconference apparatus working as the transmission terminal. Thus, the reproduction data accumulates (over flow).

A disclosed videoconference apparatus handles the above problems (See Patent Literature). The videoconference apparatus calculates accuracy of an input time stamp based on a time difference between a time stamp found in an input stream and a time stamp of the videoconference apparatus. In the case where an error of the calculated accuracy is beyond a margin, the videoconference apparatus controls to skip or repeat the video data. Such control corrects the video data to be reproduced.

CITATION LIST

Patent Literature

[PL] Japanese Unexamined Patent Application Publication No. 2004-15553

SUMMARY OF INVENTION

Technical Problem

In a videoconference system including videoconference terminals disclosed in the above Patent Literature and offering a personal and realistic scene, when the video data is skipped or repeated, such as frame skipping or frame repeating, video temporarily pauses in the conversation, for example causing the video to temporarily pause in the conversation. Even though the videoconference terminals disclosed in Patent Literature can reduce a system, clock frequency difference between a transmission terminal and reception terminal, the reduction of system clock frequency difference causes quality deterioration, such as a video interruption.

In using the videoconference terminals disclosed in Patent Literature, as described above, the quality deterioration develops a communication problem. Hence, the videoconference terminals are unsuitable for the communication on the videoconference system offering a personal and realistic scene.

The present invention is conceived in view of the above problems and has as an object to introduce an audio and video communications apparatus and a communications method thereof, the apparatus which eliminates a system clock frequency difference, freeing a user from unconformable feeling of audio and video.

Solution to Problem

In order to achieve the above object, an audio and video communications apparatus according to an aspect of the present invention includes: a transmitting and receiving unit which transmits and receives audio and video via a network; a timing determining unit which determines timing to update a correction amount of a Presentation Time Stamp (PTS) according to information of (i) the audio to be transmitted from the transmitting and receiving unit, (ii) the video received by the transmitting and receiving unit, and (iii) the audio received by the transmitting and receiving unit, the PTS being given to the received audio or the received video; a PTS correcting unit which corrects the PTS by updating the correction amount at the timing determined by the timing determining unit; and an audio and video output unit which outputs the received audio and the received video corresponding to the corrected PTS found at a current time indicated by the audio and video communications apparatus.

According to the above structure, the audio and video communications apparatus can determine user-unnoticeable timing, and outputs PTS-corrected audio or video at the determined timing. Hence, the audio and video communications apparatus can eliminate a system clock frequency difference, freeing the user from unconformable feeling of audio and video.

The audio and video communications apparatus may further include a user input unit in which user operation information is input via a user operation, wherein, when the user, operation information received by the user input unit indicates a user operation involving a layout change of a screen providing the received video, the timing determining unit may determine timing of the user operation as the timing to update the correction amount.

According to the above structure, the audio and video communications apparatus can user-unnoticeably correct a PTS given to video, such as frame skipping, by correcting the PTS at timing when the screen layout changes. Hence, the audio and video communications apparatus can eliminate a system clock frequency difference, freeing the user from unconformable feeling of audio and video.

When a correlation value between (i) the video received by the transmitting and receiving unit and (ii) video which temporally precedes the received video is greater than a predetermined threshold value, the timing determining unit may determine, as the timing to update the correction amount, timing at which the received video is outputted by the audio and video output unit.

According to the above structure, the audio and video communications apparatus can user-unnoticeably correct a PTS given to video, such as frame skipping and frame repeating, by correcting the PTS at timing when a video to be displayed is highly correlated temporally, and a motion in the displayed video is small. Hence, the audio and video communications apparatus can eliminate a system clock frequency difference, freeing the user from unconformable feeling of audio and video.

When a data amount of the video received by the transmitting and receiving unit is lower than a predetermined threshold value, the timing determining unit may determine, as the timing to update the correction amount, timing at which the received video is outputted by the audio and video output unit.

According to the above structure, the audio and video communications apparatus can user-unnoticeably correct a PTS given to video, such as frame skipping and frame repeating, by correcting the PTS at timing when a data amount of video to be outputted and a motion in the displayed video are expected to be small. Hence, the audio and video communications apparatus can eliminate a system clock frequency difference, freeing the user from unconformable feeling of audio and video.

When a level of the audio received by the transmitting and receiving unit is smaller than a predetermined threshold value, the timing determining unit may determine timing at which the received audio is outputted by the audio and video output unit as the timing to update the correction amount.

According to the structure, the audio and video communications apparatus can free the user from unconformable feeling due to, for example, a jumpy sound caused by PTS correction by correcting the PTS at timing when a level of a sound to be reproduced is small. Hence, the audio and video communications apparatus can eliminate a system clock frequency difference, freeing the user from unconformable feeling of audio and video.

The audio and video communications apparatus may further include an audio input unit in which audio transmitted by the transmitting and receiving unit is input via microphone, wherein, when a level of the audio received by the audio input unit is higher than a predetermined threshold value, the timing determining unit may determine timing at which the received audio is outputted by the audio and video output unit as the timing to update the correction amount.

According to the structure, the audio and video communications apparatus can free the user from unconformable feeling due to, for example, a jumpy sound caused by PTS correction by correcting the PTS at timing when a level audio to be inputted is great, such that a surrounding sound is large or the user (speaker) is talking. Hence, the audio and video communications apparatus can eliminate a system clock frequency difference, freeing the user from unconformable feeling of audio and video.

The audio and video communications apparatus may further include: a buffer which temporarily stores the audio or the video received by the transmitting and receiving unit; and a PTS correction amount calculating unit which monitors a remaining capacity of the buffer and calculate the correction amount of the PTS based on the remaining capacity, wherein the PTS correcting unit may correct the PTS by adding to the PTS the correction amount of the PTS calculated by the PTS correction amount calculating unit, the PTS being given to the audio or the video with the timing determined by the timing determining unit.

According to the structure, the audio and video communications apparatus can calculate a PTS correction amount, so that a difference amount of the system clock frequency is offset. Hence, the audio and video communications apparatus can eliminate a system clock frequency difference, freeing the user from unconformable feeling of audio and video.

As well as introduced in a form of such an apparatus, the present invention may be introduced in a form of (i) an integrated circuit including processing units which the above apparatus has, (ii) a method employing the processing units which the above apparatus has as steps, and (iii) a program which causes a computer to execute the steps. The program may be distributed via a storage medium such as a CD-ROM and a communications medium such as the Internet.

Advantageous Effects of Invention

The present invention can introduce an audio and video communications apparatus and a communications method thereof, the apparatus which eliminates a system clock frequency difference, freeing a user from unconformable feeling of audio and video.

Specifically, the audio and video communications apparatus according to the implementation of the present invention determines user-unnoticeable timing to update a PTS correction amount, and corrects a video or an audio PTS at the timing. Accordingly, the audio and communications apparatus can eliminate the system clock frequency difference, freeing the user from to unconformable feeling due to, for example, a jumpy sound or skipping frames caused by the PTS correction.

DESCRIPTION OF EMBODIMENT

Described hereinafter in detail is Embodiment in the present invention with reference to the drawings.

Embodiment

Figure 1:
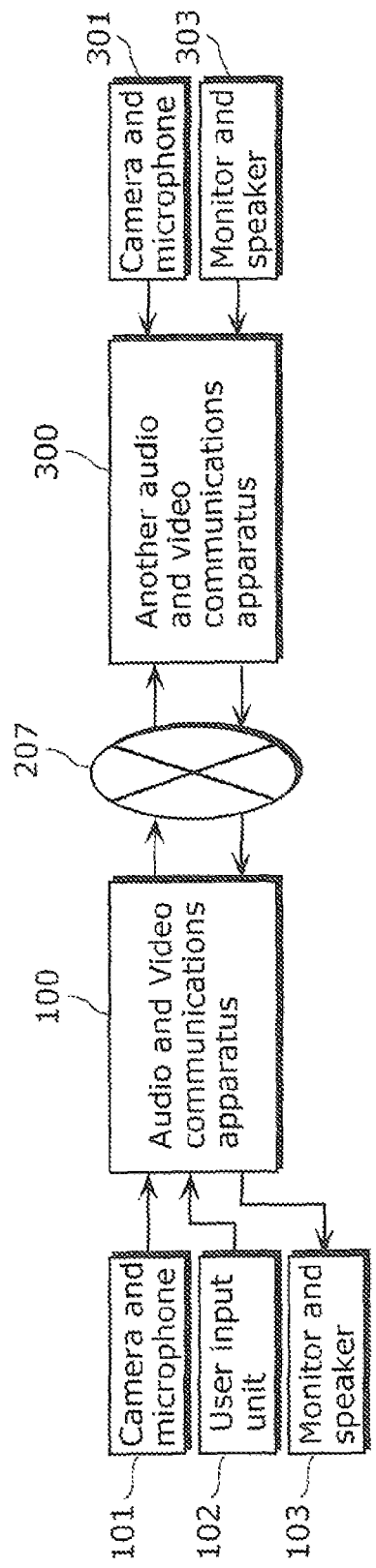
FIG. 1 exemplifies a structure of a videoconference system including a video and audio communications apparatus in the present invention.

FIG. 1 exemplifies a structure of a videoconference system including a video and audio communications apparatus in the present invention.

As shown in FIG. 1, the videoconference system has an audio and video communications apparatus 100 bi-directionally transmit audio and video data to another audio and video communications apparatus 300 via a network 207.

The audio and video communications apparatus 100 (i) transmits to the other audio and video communications apparatus 300 audio and video obtained by a camera and microphone 101, and (ii) receives audio and video data from the other audio and video communications apparatus 300. The audio and video communications apparatus 100 gives a PTS correction to the received audio and video data in order to prevent overflow and underflow from developing by a difference between system clock frequencies found in the apparatuses; namely, the audio and video communications apparatus 100 and the other audio and video communications apparatus 300. The audio and video communications apparatus 100 also provides the PTS-corrected audio and video data to a monitor and speaker 103.

The other audio and video communications apparatus 300 transmits to the audio and video communications apparatus 100 audio and video obtained by a camera and microphone 301 via the network 207. Furthermore, the other audio and video communications apparatus 300 receives audio and video data from the audio and video communications apparatus 100, and provides the received audio and video data to a monitor and speaker 303.

Figure 2:
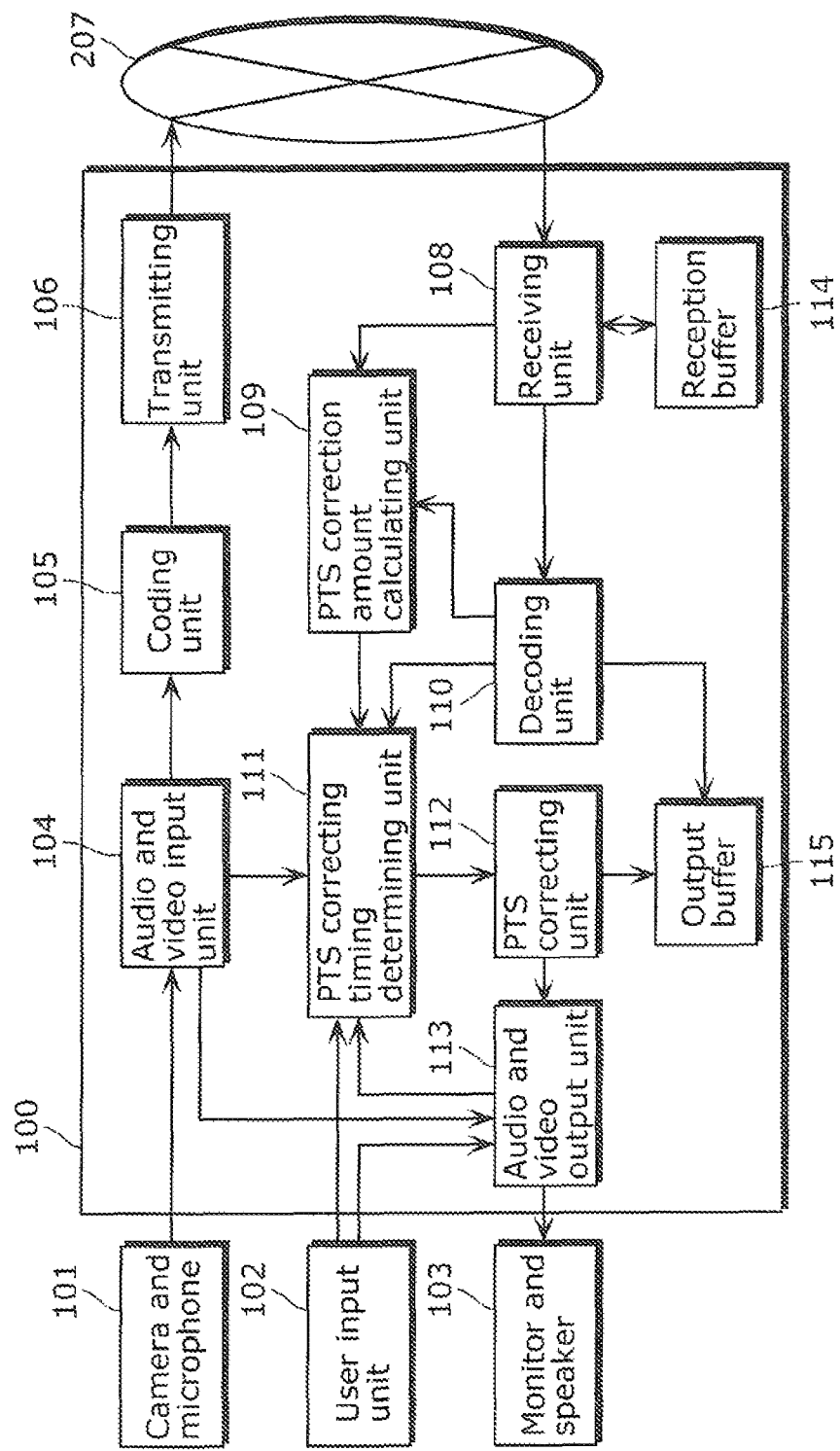
FIG. 2 is a block diagram showing a structure of the audio and video communications apparatus in the present invention.

FIG. 2 is a block diagram showing a structure of the audio and video communications apparatus in the present invention.

As shown in FIG. 2, the audio and video communications apparatus 100 includes the following: an audio and video input unit 104, a coding unit 105, a transmitting unit 106, a receiving unit 108, a PTS correction amount calculating unit 109, a decoding unit 110, a PTS correction timing determining unit 111, a PTS correcting unit 112, an audio and video output unit 113, a reception buffer 114, and an output buffer 115. The audio and video communications apparatus 100 (i) has the camera and microphone 101, which obtains video, connected outside, and (ii) is connected to a user input unit 102 working as a user Interface receiving a graphical user interface (GUI) operation from the user. Moreover, the audio and video communications apparatus 100 is connected to the monitor and speaker 103 reproducing audio and video data.

The audio and video input unit 104 is an interface used for inputting uncompressed audio and video data from the camera and microphone 101 used for obtaining video. The audio and video input unit 104 outputs the audio and video data (hereinafter referred to as audio and video communications apparatus 100 audio and video data) to the coding unit 105, the audio and video output unit 113, and the PTS correction timing determining unit 111. Here, the audio and video communications apparatus 100 audio and video data is provided per frame by the camera and microphone 101.

The coding unit 105 (i) codes (compression-codes) the audio and video communications apparatus 100 audio and video data inputted by the audio and video input unit 104, and (ii) outputs the coded audio and video communications apparatus 100 audio and video data to the transmitting unit 106. Here, the coding unit 105 employs a compression coding method, such as H. 264 and MPEG-4 AAC, to compression-code the audio and video communications apparatus 100 audio and video data.

The transmitting unit 106 outputs to the network 207 the coded audio and video communications apparatus 100 audio and video data inputted from the coding unit 105. Here, for example, the transmitting unit 106 Realtime-Transport-Protocol (RTP)-packetises the audio and video communications apparatus 100 audio and video data, and outputs the RTP-packetized data. Specifically, the transmitting unit 106 gives a PTS indicating an output time to a time stamp area included in the RTP header of an RTP packet. Then, the transmitting unit 106 outputs the RTP-packetized audio and video communications apparatus 100 audio and video data to the other audio and video communications apparatus 300 via the network 207.

Including the reception buffer 114, the receiving unit 108 receives the audio and video data (hereinafter referred to as another apparatus audio and video data) transmitted from the other audio and video communications apparatus 300 via the network 207. Then, the receiving unit 108 outputs (i) the received other apparatus audio and video data to the decoding unit 110, and (ii) an amount of the received data to the PTS correction amount calculating unit 109. Specifically, the receiving unit 108 temporally stores the RTP packet of the other apparatus audio and video data received in the reception buffer 114. The receiving unit 108 outputs a reception time and the received data amount to the PTS correction amount calculating unit 109. The reception time and the received data are extracted from the RTP packet of the other apparatus audio and video data stored in the reception buffer 114. The receiving unit 108 also outputs to the decoding unit 110 the RTP packet of the other apparatus audio and video data stored in the reception buffer 114.

The reception buffer 114 temporally stores the RTP packet of the other apparatus audio and video data received by the receiving unit 108. The RTP packet of the other apparatus audio and video data stored in the reception buffer 114 is outputted to the decoding unit 110 via the receiving unit 108.

The PTS correction amount calculating unit 109 observes an amount of received data, and calculates a PTS correction amount based on the observed received data amount. Specifically, the PTS correction amount calculating unit 109 calculates the PTS correction amount out of (i) the received data amount inputted from the receiving unit 108, and (ii) a remaining capacity of the reception buffer 114, the remaining capacity which is inputted by the decoding unit 110. Then, the PTS correction amount calculating unit 109 outputs the calculated PTS correction amount to the PTS correction timing determining unit 111.

The decoding unit 110 (i) decodes the other apparatus audio and video data inputted from the receiving unit 108, and (ii) outputs the decoded other apparatus audio and video data to the PTS correcting unit 112 and to the PTS correction timing determining unit 111. The decoding unit 110 also checks the remaining capacity of the reception buffer 114, and outputs the remaining capacity to the PTS correction amount calculating unit 109. Concurrently, the decoding unit 110 checks whether or not the decoding unit 110 is capable of decoding with enough capacity found in the output buffer 115. Then, the decoding unit 110 performs decoding process in the case where the decoding unit 110 is capable of decoding. Specifically, when the decoding unit 110 is capable of decoding with enough capacity found in the output buffer 115, the decoding unit 110, receives the RTP packet of the other apparatus audio and video data from the reception buffer 114, and performs a decoding process of the received RTP packet.

Specifically, the decoding unit 110 (i) performs conversion of the RTP packet into a coded audio data format and a coded video data format as the decoding process of the RTP packet received from the reception buffer 114, and (ii) calculates a PTS indicating the output time of the decoded RPT packet. The decoding unit 110 uses (i) H.264 to decode the coded video data, and (ii) MPEG-4 AAC to decode the coded audio data. Then, the decoding unit 110 outputs the decoded audio and video data (hereinafter referred to as decoded other apparatus audio and video data) to the PTS correction timing determining unit 111. Simultaneously, the decoding unit 110 associates the PTS with the decoded other apparatus audio and video data, and stores the associated PTS and the decoded other apparatus audio and video data in the output buffer 115.

Based on the audio transmitted by the transmitting unit 106, or information of the audio or video received by the receiving unit 108, the PTS correction timing determining unit 111 determines PTS correction timing representing timing to update a correction amount of the PTS. Then, the PTS correction timing determining unit 111 outputs to the PTS correcting unit 112 (i) the PTS correction amount calculated by the PTS correction amount calculating unit 109, and (ii) a PTS correction request. Here, the PTS correction timing is determined out of at least one of the following: the audio and video communications apparatus 100 audio and video data inputted from the audio and video input unit 104, user operation information inputted from the user input unit 102, and the decoded other apparatus audio and video data inputted from the decoding unit 110. In other words, the PTS correction timing determining unit 111 determines user-unnoticeable timing as timing to update the PTS correction amount for correcting a system clock frequency difference, and notifies the PTS correcting unit 112 of the PTS correction timing using the PTS correction request.

Based on the PTS correction request inputted from the PTS correction timing determining unit 111, the PTS correcting unit 112 corrects the PTS associated with the decoded other apparatus audio and video data. Specifically, the PTS correcting unit 112 uses the PTS correction amount outputted from the PTS correction timing determining unit 111 to correct PTS information associated with the decoded other apparatus audio and video data stored in the output buffer 115 by the decoding unit 110. Then, the PTS correcting unit 112 outputs the corrected PTS information to the audio and video output unit 113.

According to the corrected PTS information inputted from the PTS correcting unit 112, the audio and video output unit 113 outputs the decoded other apparatus audio and video data to the monitor and speaker 103. Specifically, the audio and video output unit 113 compares the corrected PTS value inputted from the PTS correcting unit 112 with a system clock (current time) of the audio and video communications apparatus 100. Then, the audio and video output unit 113 outputs the decoded other apparatus audio and video data of a PTS close to the system clock, from the output buffer 115 to the monitor and speaker 103.

Described above is a structure of the audio and video communications apparatus 100.

Detailed next are operations of the audio and video communications apparatus 100 structured above, with reference to the drawings. It is noted that the operations described below are: stored as a control program in a not-shown storage unit, for example a Read-only Memory (ROM) and a flash memory, of the audio and video communications apparatus 100; and controlled by the central processing unit (CPU).

Figure 3:
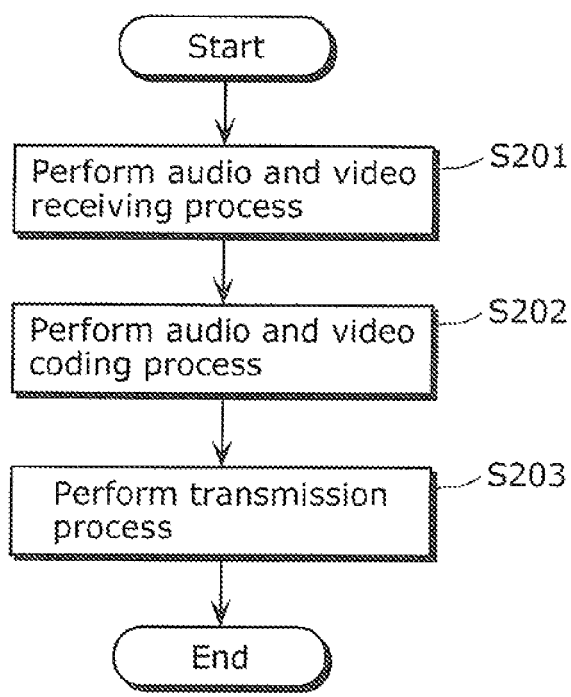
FIG. 3 is a flowchart illustrating a transmission process of the audio and video communications apparatus in the present invention.

FIG. 3 is a flowchart illustrating a transmission process of the audio and video communications apparatus in the present invention.

First, the audio and video communications apparatus 100 performs an audio and video receiving process (S201). Specifically, the audio and video input unit 104 receives uncompressed other apparatus audio and video on a frame basis from the camera and microphone 101 connected outside. Then, the audio and video input unit 104 outputs the received audio and video communications apparatus 100 audio and video data to the following: the coding unit 105, the PTS correction timing determining unit 111, and the audio and video output unit 113.

Next, the audio and video communications apparatus 100 performs the audio and video data coding process (S202). Specifically, the coding unit 105 compress-codes the uncompressed audio and video communications apparatus 100 audio and video data inputted from the audio and video input unit 104, using a compress coding technique, such as H.264 and MPEG-4 AAC. Then, the coding unit 105 outputs the coded audio and video communications apparatus 100 audio and video data to the transmitting unit 106.

Then, the audio and video communications apparatus 100 performs a transmission process (S203). Specifically, the transmitting unit 106 RTP-packetizes the coded audio and video communications apparatus 100 audio and video data inputted from the coding unit 105. In other words, the transmitting unit 106 gives a PTS indicating an output time to the time stamp area included in the RTP header. Then, the transmitting unit 106 outputs the RTP-packetized audio and video communications apparatus 100 audio and video data to the other audio and video communications apparatus 300 via the network 207.

As described above, the audio and video communications apparatus 100 outputs the local audio and video data to the other audio and video communications apparatus 300 via the network 207.

Figure 4:
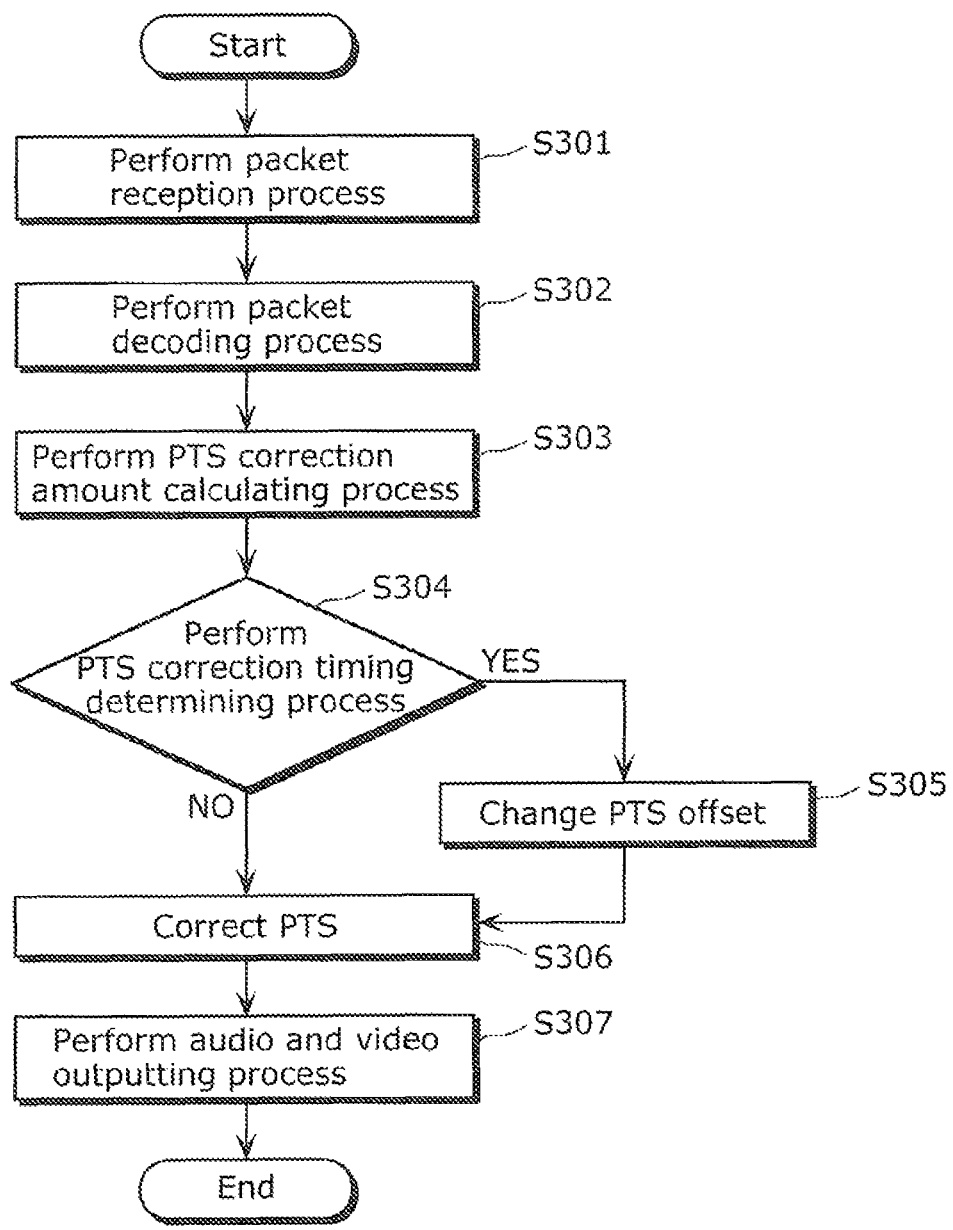
FIG. 4 is a flowchart illustrating a reception process of the audio and video communications apparatus in the present invention.

FIG. 4 is a flowchart illustrating a reception process of the audio and video communications apparatus in the present invention.

First, the audio and video communications apparatus 100 performs a packet reception process (S301). Specifically, the receiving unit 108 (i) receives via the network 207 an RTP packet of the other apparatus audio and video data transmitted from the other audio and video communications apparatus 300, and (ii) temporarily stores the received RTP packet of the other apparatus audio and video data in the reception buffer 114. Then, the receiving unit 108 outputs, to the PTS correction amount calculating unit 109, a reception time and a received data amount both extracted from the received other apparatus audio and video data stored in the reception buffer 114. In the case where the decoding unit 110 is capable of decoding, the receiving unit 108 outputs, to the decoding unit 110, the RTP packet of the received other apparatus audio and video data.

Next, the audio and video communications apparatus 100 performs a RTP packet decoding process (S302). Specifically, the decoding unit 110 checks a remaining capacity of the reception buffer 114, and outputs the remaining capacity to the PTS correction amount calculating unit 109. Concurrently, the decoding unit 110 checks whether or not the decoding unit 110 is capable of decoding with enough capacity found in the output buffer 115. When the decoding unit 110 is capable of decoding, the decoding unit 110 performs the RTP packet process on the other apparatus audio and video data received from the reception buffer 114, and calculates a PTS indicating the output time. Concurrently, the decoding unit 110 outputs the decoded other apparatus audio and video data to the PTS correction timing determining unit 111. The decoding unit 110 also associates the decoded audio data and the decoded video data with respective PTSs, and stores in the output buffer 115 the decoded audio data, the decoded video data, and the associated PTSs.

Next, the audio and video communications apparatus 100 performs a PTS correction amount calculating process (S303). Specifically, the PTS correction amount calculating unit 109 calculates a PTS correction amount out of (i) the received data amount inputted from the receiving unit 108, and (ii) the remaining capacity of the reception buffer 114, the remaining capacity which is inputted by the decoding unit 110. Then, the PTS correction amount calculating unit 109 outputs the calculated PTS correction amount to the PTS correction timing determining unit 111. The details of the PTS correction amount calculating process shall be discussed later, and thus omitted here.

Next, the audio and video communications apparatus 100 executes a PTS correction timing determining process (S304). Specifically, the PTS correction timing determining unit 111 determines PTS correction timing, using at least one of the following: the audio and video communications apparatus 100 audio and video data inputted from the audio and video input unit 104, user operation information inputted from the user input unit 102, and the decoded other apparatus audio and video data inputted from the decoding unit 110. The details of determining the PTS correction timing shall be discussed later, and thus omitted here.

In determining the PTS correction timing in S304 (S304: Yes), the PTS correction timing determining unit 111 outputs to the PTS correcting unit 112 (i) the PTS correction amount calculated by the PTS correction amount calculating unit 109, and (ii) a PTS correction request.

Next, the audio and video communications apparatus 100 changes PTS offset (S305) to correct the PTS (S306). Specifically, the PTS correcting unit 112 uses the PTS correction amount outputted from the PTS correction timing determining unit 111 to correct PTS information associated with the decoded other apparatus audio and video data stored in the output buffer 115 by the decoding unit 110. Then, the PTS correcting unit 112 outputs the corrected PTS information to the audio and video output unit 113.

Exemplified here is a PTS correction technique performed by the PTS correcting unit 112. The PTS correcting unit 112 corrects a PTS based on the following Expressions 1 to 4:

$$\text{Offset\_}V = \text{Offset\_}V\_\text{prev} + \text{Correct\_}V \qquad \text{Expression 1}$$

$$\text{Offset\_}A = \text{Offset\_}A\_\text{prev} + \text{Correct\_}A \qquad \text{Expression 2}$$

$$\text{PTS\_}V'(t) = \text{PTS\_}V(t) + \text{Offset\_}V \qquad \text{Expression 3}$$

$$\text{PTS\_}A'(t) = \text{PTS\_}A(t) + \text{Offset\_}A \qquad \text{Expression 4}$$

In Expressions 1 and 2, Offset_V and Offset_A respectively represent PTS offset values of video data and audio data. Offset_V_prev and Offset_A_prev respectively represent previous PTS offset values of the video data and the audio data. Correct_V and Correct_A respectively represent PTS correction values of the video data and the audio data. In Expressions 3 and 4, PTS_V'(t) and PTS_A'(t) respectively represent PTS-corrected PTS values of image and audio in frame t. PTS_V(t) and PTS_A(t) respectively represent PTS values of the frame t image and the frame t audio.

According to Expressions 1 to 4, the PTS correcting unit 112 adds the PTS offset values (Offset_V and Offset_A) with the PTS values (PTS_V(t) and PTS_A(t)) of the video data and the audio data of the frame t stored in the output buffer 115 so that the PTS values remain corrected.

Furthermore, the PTS correcting unit 112 uses the PTS correction amounts (Correct_V and Correct_A) outputted from the PTS correction timing determining unit 111 to update the offset values (Offset_V and Offset_A) to be used for the PTS correction.

As described above, the PTS correcting unit 112 uses the PTS correction amounts at the timing determined by the PTS correction timing determining unit 111 to update the offsets in order to change the PTSs on the PTS correction basis.

Next, the audio and video communications apparatus 100 performs an audio and video outputting process (S307). Specifically, the audio and video output unit 113 compares (i) the corrected PTS values inputted from the PTS correcting unit 112 with (ii) the system clock (current time) of the audio and video communications apparatus 100. Then, the audio and video output unit 113 outputs the decoded other apparatus audio and video data given to a PTS close to the system clock (current time) from the output buffer 115 to the monitor and speaker 103.

In the case where the PTS correction timing determining unit 111 does not determine the PTS correction timing in S304 (S304: No), the PTS correcting unit 112 outputs nothing.

Here, the PTS correcting unit 112 does not change the offsets of the PTSs (S306). The audio and video output unit 113 compares (i) the corrected PTS values inputted from the PTS correcting unit 112 with (ii) the system clock (current time) of the audio and video communications apparatus 100. Then, the audio and video output unit 113 outputs the decoded other apparatus audio and video data of a PTS close to the system clock from the output buffer 115 to the monitor and speaker 103.

As described above, the audio and video communications apparatus 100 executes a reception process.

Figure 5:
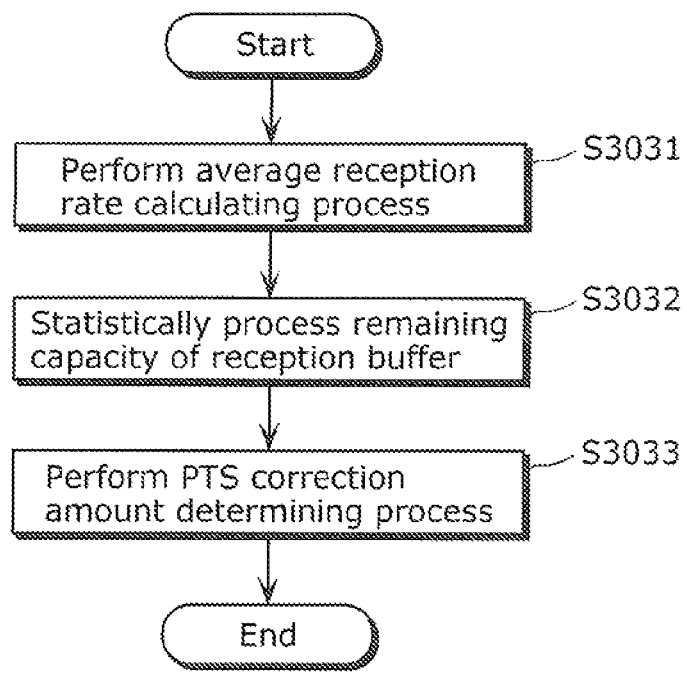
FIG. 5 is a flowchart exemplifying a PTS correction amount calculating process in the present invention.

FIG. 5 is a flowchart exemplifying a PTS correction amount calculating process according to the audio and video communications apparatus in the present invention.

First, the audio and video communications apparatus 100 performs an average reception rate calculating process (S3031). Specifically, the PTS correction amount calculating unit 109 uses the received data amount inputted from the receiving unit 108 to calculate an average reception rate (AverageBps). Expression 5 is used for calculating an average reception rate; however, an expression for calculating a reception rate shall not be limited to Expression 5.

AverageBps=SUM(RecvBits)/N          Expression 5

Here, AverageBps and RecevBits represent an average reception rate (bit/s) and a received data amount (bit), respectively. N represents a previously-set statistics period (second). Sum (RecvBits) represents a total value of received data amounts which the receiving unit 108 receives.

As shown in Expression 5, the PTS correction amount calculating unit 109 calculates an average reception rate using an average value of the data amounts received by the receiving unit 108 in the statistics period N (second).

Next, the audio and video communications apparatus 100 statistically processes a remaining capacity of the reception buffer 114 (S3032). Specifically, the PTS correction amount calculating unit 109 statistically processes a remaining capacity, of the reception buffer 114, inputted from the decoding unit 110 in order to determine whether the remaining capacity of the buffer is increasing or decreasing. As an evaluating value of the increase or the decrease, a delay time period is employed as one of effects resulting from the increase or the decrease of the remaining capacity of the buffer. Expression 6 is used for calculating a current delay time period (CurrDelay) which is an evaluation value of the increase or the decrease.

CurrDelay=(BufferLevel/AverageBps)−INIT_DELAY     Expression 6

Here, CurrDelay represents a current delay time period. BufferLevel represents a current remaining capacity (bit) of the reception buffer 114. AverageBps represents an average reception rate (biyt/s). INIT_DELAY represents a previously-set initial delay time period.

As shown in Expression 6, the PTS correction amount calculating unit 109 divides the remaining capacity of the buffer by the average reception rate in order to calculate a time period necessary to occupy the buffer. Then, in order to calculate the current delay time period, the PTS correction amount calculating unit 109 subtracts (i) the initial delay time period from (ii) the calculated time period necessary to occupy the buffer. In other words, the increase or the decrease of the current delay time period tells how the remaining capacity of the reception buffer 114 varies the delay time period. It is noted that in order to simplify the description, the increase or the decrease of the current delay time period is not statistically-processed; instead, the current delay time period (CurrentDelay) is calculated at a regular interval with Expression 6. The average reception rate is equivalent to an average coded rate, and thus is used to calculate a time period observed for occupying the buffer.

Next, the audio and video communications apparatus 100 performs a PTS correction amount determining process (S3033). Specifically, the PTS correction amount calculating unit 109 uses the average reception rate (AverageBps) and the remaining capacity of the reception buffer 114 to calculate the PTS correction amount. Expression 7 is used for calculating the PTS correction amount.

Expression 7

```
if( ( CurrDelay > 0) && ( | CurrDelay| − TH_H > 0) ){
    Correct_A = − (CurrDelay − TH_H) × SCALE:
    Correct_V = − (CurrDelay − TH_H) × SCALE;
```

-continued

Expression 7

```
] else if(( CurrDelay < 0) && ( | CurrDelay| − TH_L > 0) ){
    Correct_A = ( |CurrDelay| − TH_L) × SCALE;
    Correct_V = ( |CurrDelay| − TH_L) × SCALE;
}else{
    Correct_A = 0;
    Correct_V = 0;
}
```

CurrDelay represents a current delay time period. Correct_A and Correct_V represent a PTS correction amount of audio and a PTS correction amount of video, respectively. TH_H and TH_L represent predetermined thresholds (TH_L<INIT_DELAY<TH_L). SCALE represents a constant used for converting second to 90 kHZ which is a unit of a PTS.

Expression 7 also defines the following 1 to 3:1. When the current delay time period has a positive value and its absolute value is greater than a threshold value (TH_H), the PTS correction amount has a negative value. 2. When the current delay time period has a negative value and its absolute value is greater than a threshold value (TH_L), the PTS correction amount has a positive value. 3. Other than 1. and 2., the PTS correction amount is zero.

As described above, the PTS correction amount calculating unit 109 determines a PTS correction amount by determining a threshold value of a current delay time period as indicated in Expression 7.

It is noted that the PTS correction amount calculating unit 109 calculates an identical value as the PTS correction amounts for audio and video in Expression 7; concurrently, a calculation technique of the PTS correction amount shall not be limited to Expression 7. For example, the PTS correction amount calculating unit 109 may separately handle the current delay time period and the average reception rate for each audio and video, so that a separate PTS correction amount may be calculated for audio and video.

As described above, the audio and video communications apparatus 100 performs a PTS correction amount calculating process.

Exemplified next is a PTS correction timing determining process performed by the audio and video communications apparatus 100, with reference to FIGS. 6 to 11.

Figure 6:
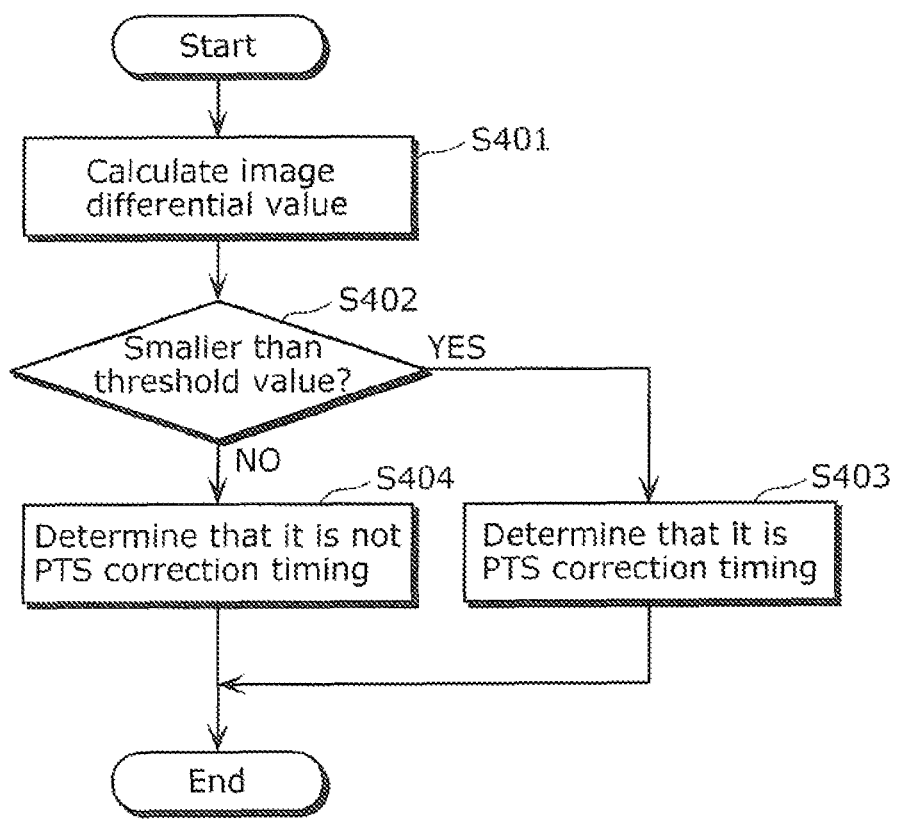
FIG. 6 is a flowchart illustrating an image differential value calculating process in the present invention.

FIG. 6 is a flowchart illustrating an image differential value calculating process in the present invention.

First, the PTS correction timing determining unit 111 performs a subtracting process between subsequent images using the decoded video data inputted from the decoding unit 110, and calculates a sum of absolute difference (SAD) as an image differential value (S401).

Next, the PTS correction timing determining unit 111 determines whether or not the calculated image differential value is smaller than a predetermined threshold value (S402).

When the calculated image differential value is smaller than the predetermined threshold value (S402: Yes), the PTS correction timing determining unit 111 determines that it is PTS correction timing (S403). As described above, the PTS correction timing determining unit 111 determines user-unnoticeable timing as the PTS correction timing to update the PTS correction amount. At the user-unnoticeable timing, a motion in the displayed image is small. Thus, it is inconceivable for the user to see when the video data is skipped or repeated due to frame skipping or frame repeating.

Concurrently, when the calculated image differential value is greater than the predetermined threshold value (S402: No), the PTS correction timing determining unit 111 determines that it is not PTS correction timing (S404).

As described above, the PTS correction timing determining unit 111 determines PTS correction timing using the decoded video data inputted from the decoding unit 110.

An SAD as the above described image differential value is calculated using Expression 8, for example.

$$SAD(i) = \sum_{y=1}^{H} \sum_{x=1}^{W} (|Y(x, y, i) - Y(x, y, i-1)|) \quad \text{Expression 8}$$

Here, an SAD (i) represents a sum of absolute difference of the i-th image. Y(x,y,i) represents a luminance value of a pixel located at an x-coordinate and a y-coordinate of the i-th image. W represents the number of horizontally-arranged pixels in an image. H represents the number of vertically-arranged pixels in an image.

As shown in Expression 8, the image differential value represents an SAD between subsequent images. A smaller image differential value presents an image having temporality less motion. Hence, when the image differential value calculated above is smaller than the predetermined threshold value, the PTS correction timing determining unit 111 determines that it is the timing to update the PTS correction amount, the timing which is user-unnoticeable in correcting a system clock frequency difference.

It is noted that a calculating technique of the image differential value shall not be limited to the one using Expression 8; instead, any technique may be employed as far as the technique can estimate intra-picture motion. Another technique for estimating intra-picture motion may for example involve monitoring a data amount of received video, and determining that the received video has less motion in the case where a data amount of the received video is small. This is because video coding often involves predicting a differential image between frames to perform image coding. The image with less motion has a smaller differential value, and a data amount representing the coding result is small as well.

Figure 7:
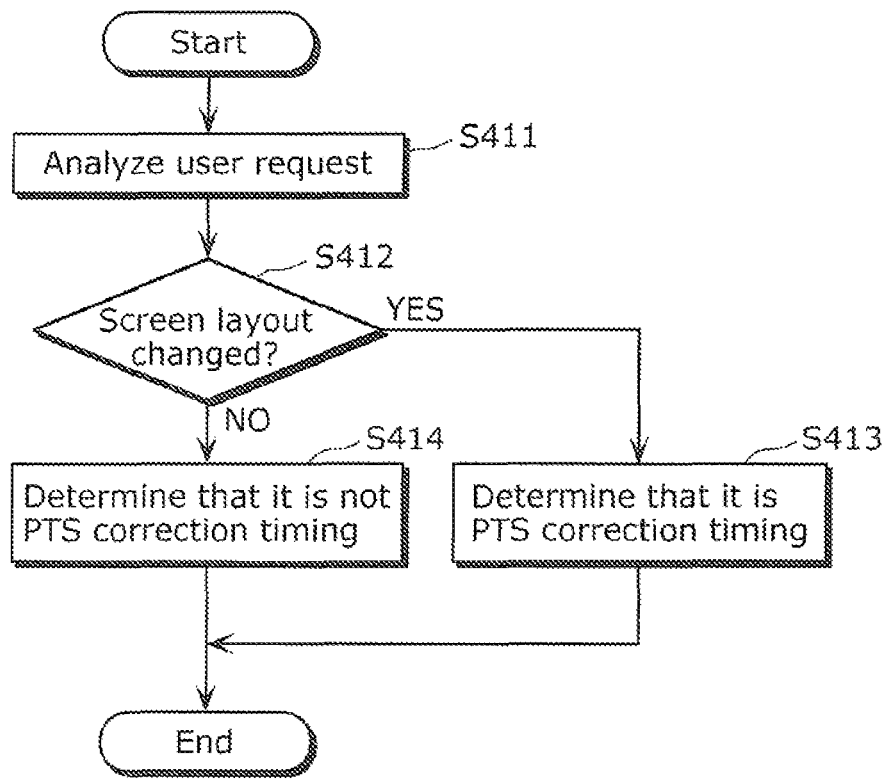
FIG. 7 is a flowchart illustrating a screen layout determining process in the present invention.

FIG. 7 is a flowchart illustrating a screen layout determining process in the present invention.

First, the PTS correction timing determining unit 111 analyzes (S411) user operation information, such as a user request, inputted from the user input unit 102 to determine whether or not a screen layout is to be changed (S412).

When the PTS correction timing determining unit 111 analyzes the user operation information to determine the screen layout change by observing screen transition shown in the following 1 to 3 (S412: Yes), the PTS correction timing determining unit 111 determines that it is PTS correction timing (S413):

1. Transition of screens between a displayed image of the audio and video communications apparatus 100 and a displayed image of the other apparatus.

2. Transition of screens between a displayed image of the other apparatus and a displayed graphical user interface (GUI).

3. Transition of screens between a displayed GUI and a displayed screen of the audio and video communications apparatus 100.

As described above, the PTS correction timing determining unit 111 determines the following timing as the PTS correction timing to update the PTS correction amount: the timing at which the screen layout changes so that user is unnoticeable in PTS-correcting of an image, such as frame skipping.

Concurrently, when the PTS correction timing determining unit 111 analyzes that no such screen transition is to be seen according to the user operation information, the PTS correction timing determining unit 111 determines that (i) no change is made in the screen layout (S402: No), and (ii) it is not the PTS correction timing (S414).

As described above, the PTS correction timing determining unit 111 uses the user operation information inputted by the user input unit 102 to determine PTS correction timing.

It is noted that the screen transition to be determined as the screen layout change shall not be limited to 1 to 3 showing the screen changes as described above. For example, when the GUI is always displayed on the screen which the user is watching, the screen layout is determined to be changed in the case where the user is manipulating the menu on the GUI.

Figure 8:
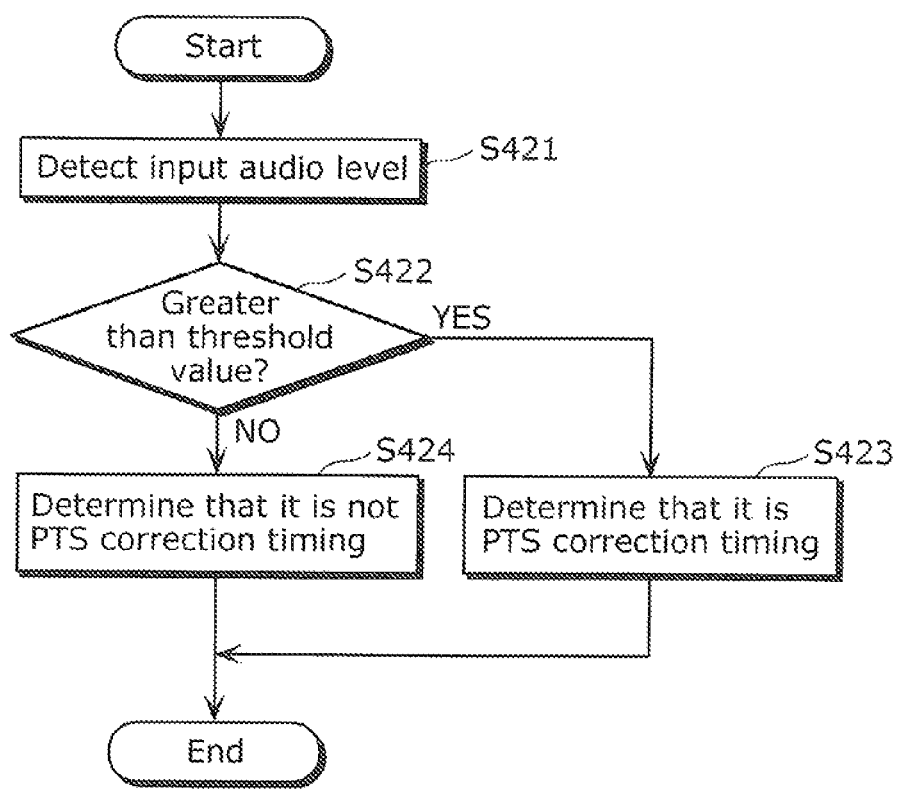
FIG. 8 is a flowchart illustrating an input audio level detecting process in the present invention.

FIG. 8 is a flowchart illustrating an input audio level detecting process in the present invention.

First, the PTS correction timing determining unit 111 detects an input audio level (AudioInLevel) using input audio data provided from the audio and video input unit 104 (S421). Here, the detected input audio level is, for example, an average volume level in a certain interval.

Next, the PTS correction timing determining unit 111 determines whether or not the detected input audio level higher than a predetermined threshold value (S422).

When the detected input audio level is higher than the predetermined threshold value (S422: Yes), the PTS correction timing determining unit 111 determines that it is PTS correction timing (S423). This is because when the detected input audio level is great, it is either a surrounding sound is large or the user (speaker) is talking, and thus a jumpy sound of received audio is inconceivable for the user. Hence, the PTS correction timing determining unit 111 can determine that it is the PTS correction timing to update the PTS correction amount.

Concurrently, the PTS correction timing determining unit 111 determines that it is not the PTS correction timing (S424) when the detected input audio level is smaller than the predetermined threshold value (S422: No).

As described above, the PTS correction timing determining unit 111 uses input audio data, of the audio and video communications apparatus 100, provided from the audio and video input unit 104 to determine PTS correction timing.

Figure 9:
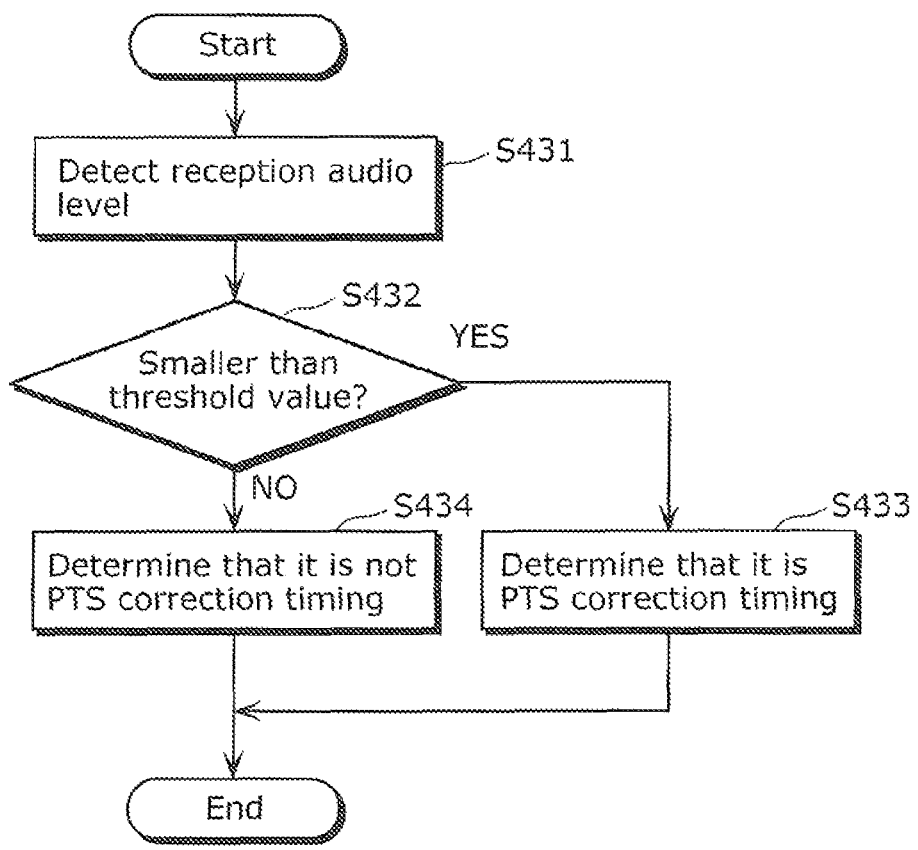
FIG. 9 is a flowchart illustrating a reception audio level detecting process in the present invention.

FIG. 9 is a flowchart illustrating a reception audio level detecting process in the present invention.

First, the PTS correction timing determining unit 111 detects a reception audio level (AudioOutLevel) using decoded audio data inputted from the decoding unit 110 (S431). Here, the detected reception audio level is, for example, an average volume level in a certain interval.

Next, the PTS correction timing determining unit 111 determines whether or not the detected reception audio level is lower than a predetermined threshold value (S432).

When the detected input audio level is lower then the predetermined threshold value (S432: Yes), the PTS correction timing determining unit 111 determines that it is PTS correction timing (S433). This is because when the detected reception audio level is lower than the predetermined threshold value, a jumpy sound of received audio is inconceivable for the user. Hence, the PTS correction timing determining unit 111 can determine that it is the PTS correction timing to update the PTS correction amount.

Concurrently, the PTS correction timing determining unit 111 determines that it is not the PTS correction timing (S424)

when the detected input audio level is higher than the predetermined threshold value (S422: No).

As described above, the PTS correction timing determining unit 111 uses the decoded audio data inputted from the decoding unit 110 to determine PTS correction timing.

The PTS correction timing determining unit 111 may employ at least one of the processes introduced in FIGS. 6 to 9 to determine PTS correction timing. For example, the PTS correction timing determining unit 111 may determine the PTS correction timing only either for video or for audio.

Figure 10:
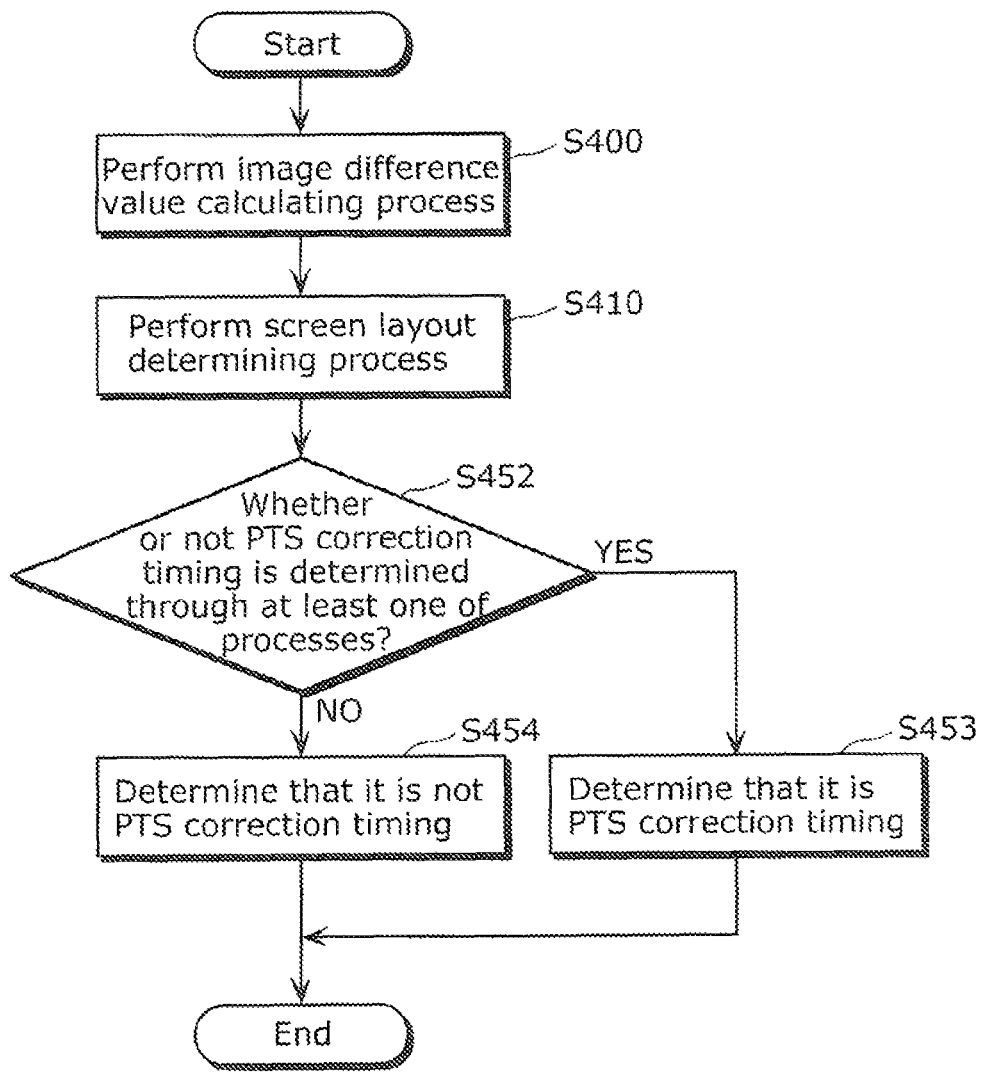
FIG. 10 is a flowchart illustrating a PTS correction timing determining process for video of the audio and video communications apparatus in the present invention.

FIG. 10 is a flowchart illustrating a PTS correction timing determining process for video of the audio and video communications apparatus in the present invention.

As shown in FIG. 10, first, the PTS correction timing determining unit 111 performs an image difference value calculating process (S400). Then, the PTS correction timing determining unit 111 performs a screen layout determining process (S410). It is noted that the image difference value calculating process in S400 involves the above-described processes in S401 to S404, and the screen layout determining process in S410 involves the above-described processes in S411 to S414. Thus, the details thereof shall be omitted.

Next, the PTS correction timing determining unit 111 checks (S452) whether or not the PTS correction timing is determined through at least one of the processes; namely, S400 or S420.

When the PTS correction timing is determined though at least one of the processes; namely S400 and S420 (S452: Yes), the PTS correction timing determining unit 111 determines that it is the PTS correction timing (S453).

As the PTS correction timing to update the PTS correction amount, as described above, the PTS correction timing determining unit 111 determines the timing at which (i) a motion in the displayed video is small or (ii) a screen layout drastically changes. Here, the timing regarded as the PTS correction timing is inconceivable for the user to see when the video data is skipped or repeated due to frame skipping or frame repeating.

Concurrently, when the PTS correction timing is not determined through neither process; namely S400 nor S420 (S452: No), the PTS correction timing determining unit 111 determines that it is not the PTS correction timing (S454).

As described above, the PTS correction timing determining unit 111 determines the PTS correction timing of the video.

Similarly, described below is how PTS correction timing of audio is determined.

Figure 11:
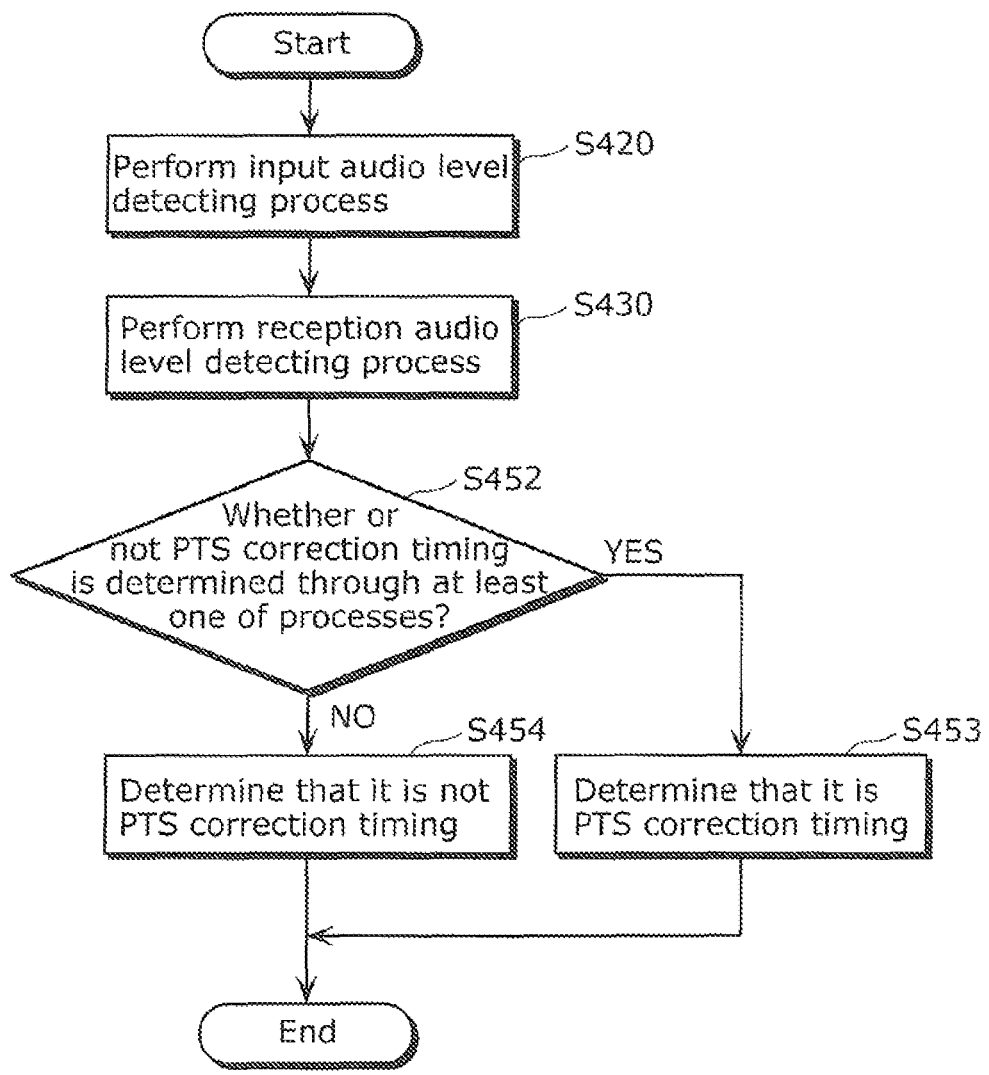
FIG. 11 is a flowchart illustrating a PTS correction timing determining process for audio of the audio and video communications apparatus in the present invention.

FIG. 11 is a flowchart illustrating a PTS correction timing determining process for audio of the audio and video communications apparatus in the present invention.

As shown in FIG. 11, first, the PTS correction timing determining unit 111 performs an input audio level detecting process (S420). Then, the PTS correction timing determining unit 111 performs a reception audio level process (S430). It is noted that the input audio level detecting process level in S420 involves the above-described processes in S421 to S424; and the reception audio level process in S430 involves the above-described processes in S431 to S434. Thus, the details thereof shall be omitted.

Next, the PTS correction timing determining unit 111 checks (S452) whether or not the PTS correction timing is determined through at least one of the processes; namely, S420 or S430. When the PTS correction timing is determined though at least one of the processes; namely S420 and S430 (S452: Yes), the PTS correction timing determining unit 111 determines that it is the PTS correction timing (S453).

As described above, the PTS correction timing determining unit 111 determines timing at which (i) the input audio level is great or (ii) the reception audio level is small as the PTS correction timing to update the PTS correction amount. Here, the timing regarded as the PTS correction timing is unnoticeable for the user to hear a jumpy sound.

Concurrently, when the PTS correction timing is not determined through neither process; namely S400 nor S420 (S452: No), the PTS correction timing determining unit 111 determines that it is not the PTS correction timing (S454).

As described above, the PTS correction Aiming determining unit 111 determines the PTS correction timing of audio.

It is noted that the PTS correction timing determining unit 111 may simultaneously determine the PTS correction timing for both of audio and video shown in FIGS. 10 and 11. The PTS correction timing determining unit 111 may also determine the PTS correction timing using any given combination of S400, S410, S420, and S430.

As described above, Embodiment has described the following operations: the PTS correction amount calculating unit 109 monitors an increase and a decrease in the capacity of the reception buffer 114 to calculate a PTS correction amount, so that o a difference amount of the system clock frequency is offset; and the PTS correction timing determining unit 111 determines PTS correction timing as user-unnoticeable timing employed for correcting video and audio. Based on the PTS correction request determined by the PTS correction timing determining unit 111, the PTS correcting unit 112 uses the PTS correction amount to correct a PTS for the audio or the video. The audio and video output unit 113 then outputs the audio and the video according to the corrected PTS.

The present invention makes possible correcting an output time (eliminating a system clock frequency difference) required due to a system clock difference between transmission and reception terminals, such as the audio and video communications apparatus 100 and the other audio and video communications apparatus 300, freeing the user from unconformable feeling of audio and video.

As described above, the present invention can prevent overflow or underflow of the reception buffer 114 as well as correct a PTS to keep audio and video synchronized.

In an audio and video communications apparatus employed especially as a videoconference apparatus equipped with a large screen and providing a realistic scene, the present invention is capable of and effective in preventing subjective quality from deteriorating due to skipping frames and jumpy sounds which affect a personal scene.

Figure 12:
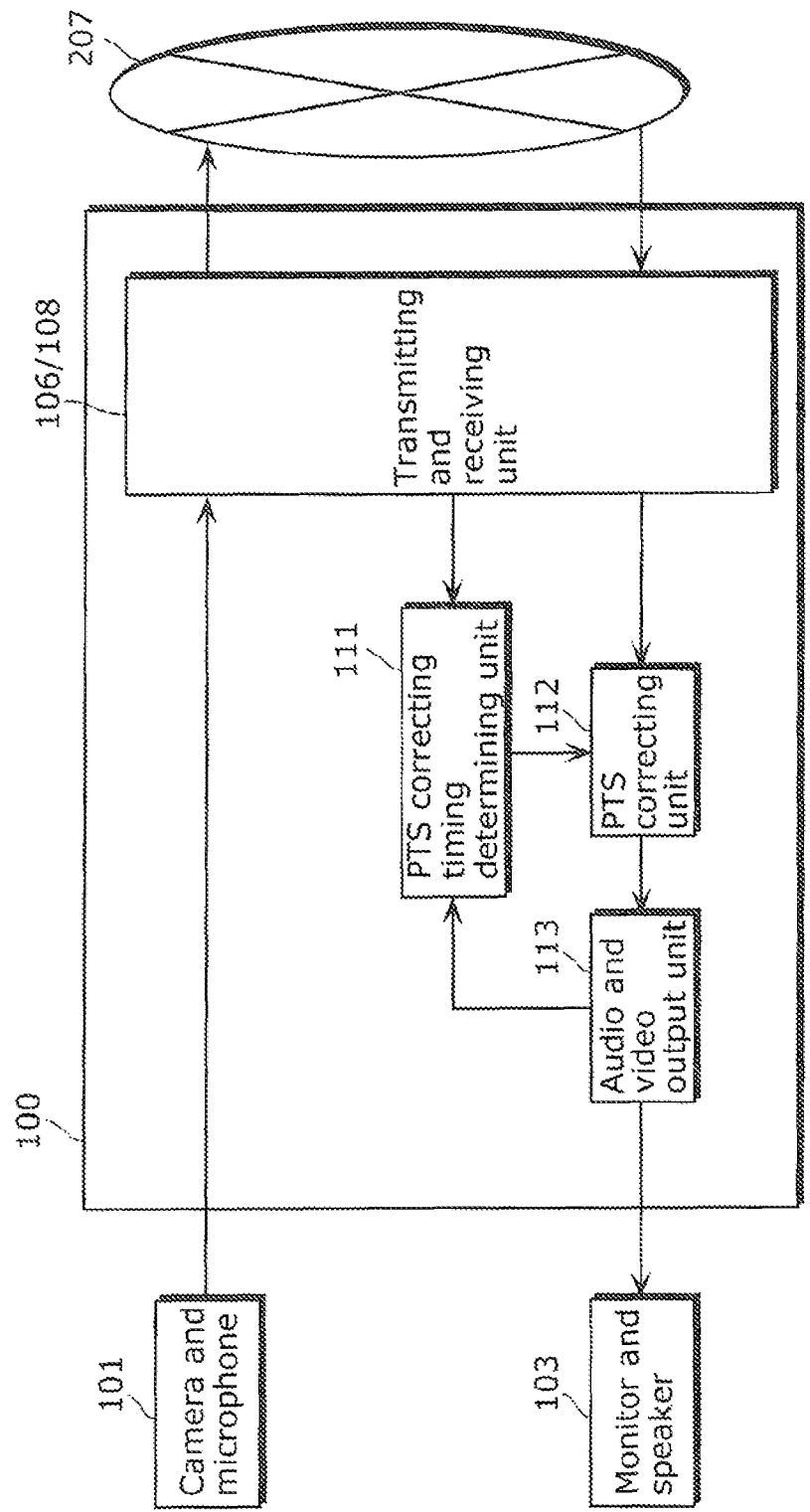
FIG. 12 is a block diagram showing a minimal structure of the audio and video communications apparatus in the present invention.

It is noted that, in the above description, the audio and video communications apparatus 100 in the present invention includes the following: the audio and video input unit 104, the coding unit 105, the transmitting unit 106, the receiving unit 108, the PTS correction amount calculating unit 109, the decoding unit 110, the PTS correction timing determining unit 111, the PTS correcting unit 112, the audio and video output unit 113, the reception buffer 114, and the output buffer 115. Concurrently, the constituent features of the audio and video communications apparatus 100 shall not be limited to those. As shown in FIG. 12, the audio and video communications apparatus 100 may include at least the following as minimally-required constituent features: a transmitting and receiving unit 106/108, the PTS correction timing determining unit 111, the PTS correcting unit 112, and the audio and video output unit 113.

Specifically, as the minimally-required constituent features, the audio and video communications apparatus 100 has: the transmitting and receiving unit 106/108 transmitting and receiving audio and video via a network; the PTS correction timing determining unit 111 determining timing to update a PTS correction amount for the audio or video received by the transmitting and receiving unit 106/108 according to the information of the received audio and video; the PTS correcting unit 112 correcting the PTS by updating the PTS correction amount for the received audio and video according to the timing determined by the PTS correction timing determining unit 111; and the audio and video output unit 113 outputting the received audio and video corresponding to the corrected PTS at a current time indicated by the audio and video communications apparatus 100. Here, the transmitting and receiving unit 106/108 has the transmitting unit 106 and the receiving unit 108 integrated into one.

The minimally-required constituent features can determine user-unnoticeable timing, and outputs PTS-corrected audio or video at the determined timing. Hence, the minimally-required constituent features can eliminate a system clock frequency difference, freeing the user from unconformable feeling of audio and video. Accordingly, introduced is an audio and video communications apparatus which can eliminate a system clock frequency difference, freeing the user from unconformable feeling of audio and video.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention is useful in audio and video communications apparatuses and methods thereof, and, in particular, to an audio and video communications apparatus equipped with a large screen and providing a realistic scene.

REFERENCE SIGNS LIST

100 Audio and video communications apparatus
101 and 301 Camera and microphone
102 User input unit
103 and 303 Monitor and speaker
104 Audio and video input unit
105 Coding unit
106 Transmitting unit
108 Receiving unit
109 PTS correction amount calculating unit
110 Decoding unit
111 PTS correction timing determining unit
112 PTS correcting unit
113 Audio and video output unit
114 Reception buffer
115 Output buffer
207 Network
300 Another audio and video communications apparatus

The invention claimed is:

1. An audio and video communications apparatus comprising:
   a transmitting and receiving unit configured to transmit and receive audio and video via a network;
   a timing determining unit configured to determine a timing at which to update a correction amount of a Presentation Time Stamp (PTS) according to information of (i) the audio to be transmitted from said transmitting and receiving unit, (ii) the video received by said transmitting and receiving unit, and (iii) the audio received by said transmitting and receiving unit, the PTS being given to the received audio or the received video;
   a PTS correcting unit configured to correct the PTS by updating the correction amount at the timing determined by said timing determining unit; and
   an audio and video output unit configured to output the received audio and the received video corresponding to the corrected PTS found at a current time indicated by the audio and video communications apparatus,
   wherein said timing determining unit is configured to determine a difference value of pixels between (i) the video received by said transmitting and receiving unit and (ii) video which temporally precedes the received video, and
   when the difference value of pixels between (i) the video received by said transmitting and receiving unit and (ii) the video which temporally precedes the received video is determined to be smaller than a predetermined threshold value, said timing determining unit determines that it is the timing at which to update the correction amount.

2. The audio and video communications apparatus according to claim 1, further comprising
   a user input unit in which user operation information is input via a user operation,
   wherein, when the user operation information received by said user input unit indicates a user operation involving a layout change of a screen providing the received video, said timing determining unit determines that it is the timing at which to update the correction amount.

3. The audio and video communications apparatus according to claim 1,
   wherein, when a data amount of the video received by said transmitting and receiving unit is lower than a predetermined threshold value, said timing determining unit determines that it is the timing at which to update the correction amount.

4. The audio and video communications apparatus according to claim 1,
   wherein, when a level of the audio received by said transmitting and receiving unit is smaller than a predetermined threshold value, said timing determining unit determines that it is the timing at which to update the correction amount.

5. The audio and video communications apparatus according to claim 1, further comprising
   an audio input unit in which audio transmitted by said transmitting and receiving unit is input via microphone,
   wherein, when a level of the audio received by said audio input unit is higher than a predetermined threshold value, said timing determining unit determines that it is the timing at which to update the correction amount.

6. The audio and video communications apparatus according to claim 1, further comprising:
   a buffer which temporarily stores the audio or the video received by said transmitting and receiving unit; and
   a PTS correction amount calculating unit configured to monitor a remaining capacity of said buffer and calculate the correction amount of the PTS based on the remaining capacity,
   wherein said PTS correcting unit is configured to correct the PTS by adding to the PTS the correction amount of the PTS calculated by said PTS correction amount calculating unit, the PTS being given to the audio or the video with the timing determined by said timing determining unit.

7. The audio and video communications apparatus according to claim 6,
wherein said PTS correction amount calculating unit is configured to calculate (i) a correction amount of a PTS in a negative value in the case where the remaining capacity monotonically increases, and (ii) a correction amount of a PTS in a positive value in the case where the remaining capacity monotonically decreases.

8. The audio and video communications apparatus according to claim 1,
wherein the difference value of pixels is calculated using an expression below:

$$SAD(i) = \sum_{y=1}^{H} \sum_{x=1}^{W} (|Y(x, y, i) - Y(x, y, i-1)|)$$

wherein Y(x,y,i) represents a luminance value of a pixel located at an x-coordinate and a y-coordinate of an i-th image,
W represents the number of horizontally-arranged pixels in an image, and
H represents the number of vertically-arranged pixels in an image.

9. A communications method executed by an audio and video communications apparatus, said method comprising:
transmitting and receiving audio and video via a network;
determining a timing at which to update a correction amount of a PTS according to information of (i) the audio to be transmitted in said transmitting and receiving, and (ii) the video or the audio received in said transmitting and receiving, the PTS being given to the received audio or the received video;
correcting the PTS by updating the correction amount of the PTS at the timing determined in said determining timing; and
outputting the received audio and the received video corresponding to the corrected PTS found at a current time indicated by the audio and video communications apparatus,
wherein said determining a timing further comprises determining a difference value of pixels between (i) the video received in said transmitting and receiving and (ii) video which temporally precedes the received video, and
when the difference value of pixels between (i) the video received in said transmitting and receiving and (ii) the video which temporally precedes the received video is smaller than a predetermined threshold value, it is determined in said determining a timing that it is the timing at which to update the correction amount.

10. A non-transitory computer-readable medium having a program stored thereon for communication by an audio and video communications apparatus, the program causing a computer to execute:
transmitting and receiving audio and video via a network;
determining a timing at which to update a correction amount of a PTS according to information of (i) the audio to be transmitted in said transmitting and receiving, and (ii) the video or the audio received in said transmitting and receiving, the PTS being given to the received audio or the received video;
correcting the PTS by updating the correction amount of the PTS at the timing determined in said determining timing; and
outputting the received audio and the received video corresponding to the corrected PTS found at a current time indicated by the audio and video communications apparatus,
wherein said determining a timing further comprises determining a difference value of pixels between (i) the video received in said transmitting and receiving and (ii) video which temporally precedes the received video, and
when the difference value of pixels between (i) the video received in said transmitting and receiving and (ii) the video which temporally precedes the received video is smaller than a predetermined threshold value, it is determined in said determining a timing that it is the timing at which to update the correction amount.

11. An integrated circuit in an audio and video communications apparatus, said circuit comprising:
a transmitting and receiving circuit configured to transmit and receive audio and video via a network;
a timing determining circuit configured to determine a timing at which to update a correction amount of a Presentation Time Stamp (PTS) according to information of (i) the audio to be transmitted from said transmitting and receiving circuit, (ii) the video received by said transmitting and receiving circuit, and (iii) the audio received by said transmitting and receiving circuit, the PTS being given to the received audio or the received video;
a PTS correcting circuit configured to correct the PTS by updating the correction amount at the timing determined by said timing determining circuit; and
an audio and video output circuit configured to output the received audio and the received video corresponding to the corrected PTS found at a current time indicated by the audio and video communications apparatus,
wherein said timing determining circuit is configured to determine a difference value of pixels between (i) the video received by said transmitting and receiving circuit and (ii) video which temporally precedes the received video, and
when the difference value of pixels between (i) the video received by said transmitting and receiving circuit and (ii) the video which temporally precedes the received video is determined to be smaller than a predetermined threshold value, said timing determining circuit determines that it is the timing at which to update the correction amount.

* * * * *